United States Patent
Liou et al.

(10) Patent No.: US 7,047,435 B2
(45) Date of Patent: May 16, 2006

(54) SYSTEM AND METHOD FOR CLOCK-SYNCHRONIZATION IN DISTRIBUTED SYSTEMS

(75) Inventors: Shih-Ping Liou, West Windsor, NJ (US); Ruediger Schollmeier, Gauting (DE); Kilian Heckrodt, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 785 days.

(21) Appl. No.: 10/023,682

(22) Filed: Dec. 18, 2001

(65) Prior Publication Data

US 2002/0136335 A1 Sep. 26, 2002

Related U.S. Application Data

(60) Provisional application No. 60/256,649, filed on Dec. 19, 2000.

(51) Int. Cl.
*G06F 1/04* (2006.01)
*G06F 1/12* (2006.01)
*H04L 7/00* (2006.01)

(52) U.S. Cl. .............. 713/500; 713/375; 713/400
(58) Field of Classification Search .......... 713/375, 713/503, 600, 500, 400; 709/228
See application file for complete search history.

(56) References Cited

U.S. PATENT DOCUMENTS

| | | | |
|---|---|---|---|
| 4,302,831 A | 11/1981 | Zemanek | 375/111 |
| 4,980,899 A | 12/1990 | Troost et al. | 375/108 |
| 5,416,800 A * | 5/1995 | Frank | 375/239 |
| 5,471,631 A * | 11/1995 | Beardsley et al. | 713/502 |
| 5,579,513 A | 11/1996 | Strohmer | 395/559 |
| 5,822,317 A * | 10/1998 | Shibata | 370/395.62 |
| 5,958,060 A * | 9/1999 | Premerlani | 713/400 |
| 6,104,767 A * | 8/2000 | Atarius et al. | 375/344 |
| 6,148,049 A | 11/2000 | Hein | 375/354 |
| 6,199,169 B1 * | 3/2001 | Voth | 713/400 |
| 6,502,141 B1 * | 12/2002 | Rawson, III | 713/375 |
| 6,882,634 B1 * | 4/2005 | Bagchi et al. | 370/338 |
| 2002/0120416 A1 * | 8/2002 | Liu et al. | 702/79 |

OTHER PUBLICATIONS

Moon, S.B., Skelly, P. and Towsley, D., Estimation and Removal of Clock Skew from Network Delay Measurements. In Proceedings of the IEEE INFOCOM Conference on Computer Communications, p. 227-234, Mar. 1999.*

Paxson, V., On Calibrating Measurements of Packet Transit Times. In Proceedings of the ACM SIGMETRICS, Madison, Wisconsin, Jun. 1998.*

Article entitled *Simple Network Time Protocol (SNTP) Version 4 for Ipv4,Ipv6 and OSI*, from web page http://faqs.org/rfcs/rfc2030.html.

* cited by examiner

*Primary Examiner*—Thomas Lee
*Assistant Examiner*—Ji H. Bae
(74) *Attorney, Agent, or Firm*—Donald B. Paschburg; F. Chau & Associates, LLP (57) ABSTRACT

A method is provided for synchronizing distributed processors. The method comprises determining a desired number of offset values between two processors, wherein each processor comprises a quartz crystal, determining parameters of a regression line, wherein the regression line is a function of the offset values over the desired number of offsets, and adjusting a synchronization interval according to the parameters.

15 Claims, 6 Drawing Sheets

SYSTEM AND METHOD FOR CLOCK-SYNCHRONIZATION IN DISTRIBUTED SYSTEMS

This application claims the benefit of Provisional application Ser. No. 60/256,649, file Dec. 19, 2000.

BACKGROUND OF THE INVENTION

1. Field of the Invention

The present invention relates to processor synchronization, and more particularly to clock-synchronization in distributed systems.

2. Discussion of Related Art

Quartz crystals are known to provide accurate and constant clocks for electronic equipment. For this reason they are widely used in relatively inexpensive electronic equipment such as PCs, mobile phones, wrist watches, etc. Typically, quartz crystals are grown synthetically. The frequency of a quartz crystal is determined by its thickness, d, according to:

$$f[\text{kHz}] = \frac{N[\text{kHz}*\text{mm}]}{d[\text{mm}]} \qquad \text{Equation 1}$$

For the most common AT-cut, the constant N is N=1660 kHz*mm. AT specifies a specific plane relative to the crystal axes of the quartz. The frequency ranges from 800 khz up to 360 Mhz, and the fundamental frequency ranges up to about 40 Mhz.

Figure 1:
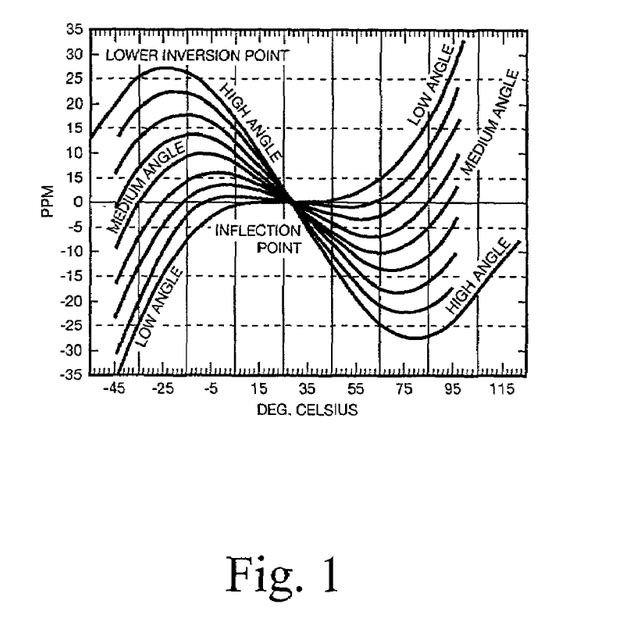
FIG. 1 shows a typical drift for various AT crystal cut angels.

The advantage of the AT-cut in comparison to other cuts is that the resonance frequency of the AT-cut is substantially independent of temperature. It follows a third grade equation (see FIG. 1, and Equation 2) with a turning point, according to the form of the quartz and frequency at 25 to 30 degrees Celsius.

$$\frac{\Delta f}{f} = a_1(T - T_{inv}) + a_3(T - T_{inv})^3 \qquad \text{Equation 2}$$

with $a_3 = 1.05 \cdot 10^{-4}$
  $a_1 = 0.0085 \cdot \Delta\phi$
  $\Delta\phi = \phi_{zz} - \phi_0$ in angle minutes, $$\frac{\Delta f}{f}$$

in ppm and T, $T_{inv}$ in degrees Celsius.

The gradient in the turning point is determined by the cut angle $\phi_{zz}$. $\Delta\phi$ is the difference between the zero angle $\phi_0$ at which the curve has a horizontal tangent in its turning point (see FIG. 1).

There are two main sources of frequency inaccuracies for commercial quartz oscillators: manufacturing inaccuracies and thermal effects. Manufacturing inaccuracies result from the finite mechanical accuracy of quartz thickness, as can be seen from Equation 1, and accuracy of the cut angle (see Equation 2) which can only be adjusted to 10 angle minutes. Inexpensive quartz oscillators have a typical relative accuracy better than $+/-10^{-4}$, which is adequate in most cases. As an example, most ITU modem recommendations specify a clock accuracy of $+/-10^{-4}$. In inexpensive equipment, this is the main source of frequency offset.

As shown in FIG. 1, additionally the quartz frequency depends on the temperature of the environment. In a room temperature environment of 15° C. . . . 25° C., the thermal inaccuracy of quartz oscillators is insignificant compared to manufacturing inaccuracy. Further, there are still other reasons for frequency inaccuracies of quartz oscillators such as long term drift and phase noise. However, these inaccuracies are typically negligible compared to the above effects.

There are many ways to improve the accuracy of oscillators, such as parallel adjustable capacitors or mounting in a temperature regulated housing. However, oscillators in standard PCs do not use such sophisticated techniques to limit complexity and costs.

One area where clock inaccuracies can be particularly troublesome is in distributed computing. The clocks of different processors need to be synchronized to limit errors. Synchronization can be a particularly difficult problem. For example, if the clocks of collaborative video discussion participants' are to be synchronized to a desirable level, e.g., up to 30 ms, it is not enough to adjust local clocks only at the beginning of a collaborative video discussion session. The clocks need to be monitored and adjusted continuously. Otherwise, the clocks will drift apart because of, for example, temperature drift, aging and the mechanical accuracy at which the frequency can be set by cutting. The drift rate is the deviation from the Coordinated Universal Time (UTC), divided by the time T, the measuring period.

One approach to distributed clock synchronization was reported by Flaviu in 1989 in his article "Probabilistic Clock Synchronization", which is the basis for many synchronization algorithms. It is called probabilistic, because in the approach it is not guaranteed that a client can always read the clock of a server with an a-priori defined precision. By means of several successive reading attempts, the client is able to synchronize onto the server's clock with an adjustable precision, and with a probability of success which is also adjustable via a maximum number of allowed reading attempts. The disadvantages of this method include: the method does not take any processing time into account, and no dynamic adjustment to the current traffic situation in a TCP/IP network is implemented. Another disadvantage of the method include to achieve a good precision, a large load may be placed on the network, caused by the synchronization messages.

Another clock synchronization method is used in the Network Time Protocol (NTP), which is an Internet Standard Recommended Protocol, described in the RFC-1119, RFC-1305 and RFC-2030. For the basic approach to measure the offset of another computer over TCP/IP, NTP is uses substantially the same algorithm as presented in David L. Mills, RFC-2030 Simple Network Time Protocol (SNTP) Version 4 for IPv4, IPv6 and OSI, Network Working Group, October 1996. To save messages, and therefore reduce the network load caused by the update messages, an additional "logical clock" is implemented on the client side. This logical clock controls the local hardware clock, so that high precision can be realized, without many synchronization messages. Although this protocol works well, and high precision can be normally achieved (up to a few tens of milliseconds in global WANs), a major disadvantage of NTP is its slow speed. Based on the experience of the Rutgers University with NTP, it may take up to 30 minutes for the client's clock to synchronize for the first time on a time server. If, in addition, the difference between the two clocks is more than a few minutes, it can take much more time for synchronization to occur for the first time.

Other minor disadvantages of NTP include: the overhead of the NTP-messages, because of security and redundancy features, and the synchronization is typically done on more than one server, which is until now was neither possible nor necessary.

Therefore, a need exists for a system and method for increasing the precision of clock synchronization in distributed systems.

SUMMARY OF THE INVENTION

According to an embodiment of the present invention, a method is provided for synchronizing distributed processors. The method comprises determining a desired number of offset values between two processors, wherein each processor comprises a quartz crystal, determining parameters of a regression line, wherein the regression line is a function of the offset values over the desired number of offsets, and adjusting a synchronization interval according to the parameters.

The desired number of offset values is thirty.

The offset values are functions of a difference between relative inaccuracies corresponding to the quartz crystal of each processor.

Determining the parameters further comprises fitting a straight line, $y=a+b \cdot x$ to a collection of N measurement pairs $(y_i;x_i)$ with minimum mean square error, wherein a and b are the parameters.

According to an embodiment of the present invention, a program storage device is provided readable by machine, tangibly embodying a program of instructions executable by the machine to perform method steps for synchronizing distributed processors. The method comprises determining a desired number of offset values between two processors, wherein each processor comprises a quartz crystal, determining parameters of a regression line, wherein the regression line is a function of the offset values over the desired number of offsets, and adjusting a synchronization interval according to the parameters.

According to another embodiment of the present invention, a method is provided for synchronizing distributed processors. The method comprises establishing a socket-connection between at least two processors, determining a roundtrip delay, and determining a roundtrip-delay threshold. The method further comprises determining a current round-trip delay and an offset, adding the current round-trip delay to a list of roundtrip delays, and determining a new roundtrip-delay threshold. The method comprises determining whether the current roundtrip delay is greater than the new threshold: upon determining the current roundtrip delay to be greater than the new threshold, determining whether a desired number of round-trip delays have been determined; and upon determining that the current threshold is not greater than the new threshold, determining whether the offset is greater than an offset threshold. The method further comprises adjusting a clock according to an offset, and determining a linear regression.

A probability of the round-trip delay being greater than the roundtrip-delay threshold is about 0.5 and a probability of the round-trip delay being less than the roundtrip-delay threshold is about 0.5

Determining whether thirty round-trip delays have been determined further comprises entering a synchronization method upon determining the desired number round-trip delays. Determining whether thirty round-trip delays have been determined further comprises determining a current round-trip delay and an offset upon determining less than the desired number delays.

Adjusting a clock according to an offset further comprises decrementing by an update-interval upon determining the offset to be greater than the offset threshold, and incrementing by the update-interval upon determining the offset to be less than the offset threshold.

The method comprises determining, recursively, a current round-trip delay and an offset.

Determining a linear regression further comprises setting a current synchronization time. The method comprises determining whether a number of measured offsets is greater than a desired number: upon determining that the number of offsets is greater than the desired number, removing an oldest offset from a list of offsets and adding a current offset to the list and determining parameters of a regression line from the list of offsets, and upon determining that the number of measured offsets is not greater than the desired number, adding the current offset to the list. The method further comprises estimating the current offset using the regression line, and incrementing the current synchronization time. The method comprises determining whether the current synchronization time is greater than an update-interval: upon determining the current synchronization time to be less than the update-interval, estimating the current offset using the regression line, and upon determining the current synchronization time to be greater than the update-interval, measuring a current roundtrip delay and offset.

The desired number of roundtrip delays is thirty.

According to an embodiment of the present invention, a system is provided for synchronizing distributed processors. The system comprises a first processor connected to a network, wherein the first processor sends a sync-request message comprising a time current local time of the first processor. The system further comprises a second processor connected to the network and connected to the first processor via the network, wherein the server receives the sync-request message, and stores a time of arrival of the sync-request message and sends a sync-response message the first processor, wherein the sync-response message comprises the current local time of the first processor, the time of arrival and a current local time to the second processor.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

In a scenario where the content of a video needs to be discussed by two or more participants in a teleconference session in real time, it is important that video is delivered synchronously to all participants. Without collaborative video delivery, it may be difficult to discuss the content, as the content would be different at every participant.

One solution would be to synchronized the clocks up to at least 30 ms, similar to the number of frames per second in the MPEG standard, namely 29.97 frames per second. Thus, the duration of each frame can be computed to 33.37 ms, which is roughly the 30 ms mentioned above. If the clocks are not synchronized, the quality of the synchronized video presentation can deteriorate. For example, if a camera recording video is moved quickly, or there is a sudden switch from one source channel to another. If in this moment, a client pauses the video stream and the clocks are not synchronized, each client will see at least one more frame. The server can then send the current frame to each client, but it can take an undesirable amount of time until the frames reach the clients.

By synchronizing a starting point of the video playback between all participants and the server to be an absolute time in which the server tells the clients when to start the playback, all the timestamps of the following frames are referenced to the updated starting point. A relative timestamp such as, "Start playing frame number x in 30 seconds" may not be useful because of unknown network delays, which cannot be estimated on 30 ms accuracy. Network delay is a measurement of the time it takes a message traveling from the server to reach the client. Further, local internal system clocks on local devices may have been set manually to within a minute or two of the actual time and are rarely reset at regular intervals. Finally, the present invention can take into account time differences between different time zones.

Figure 2:
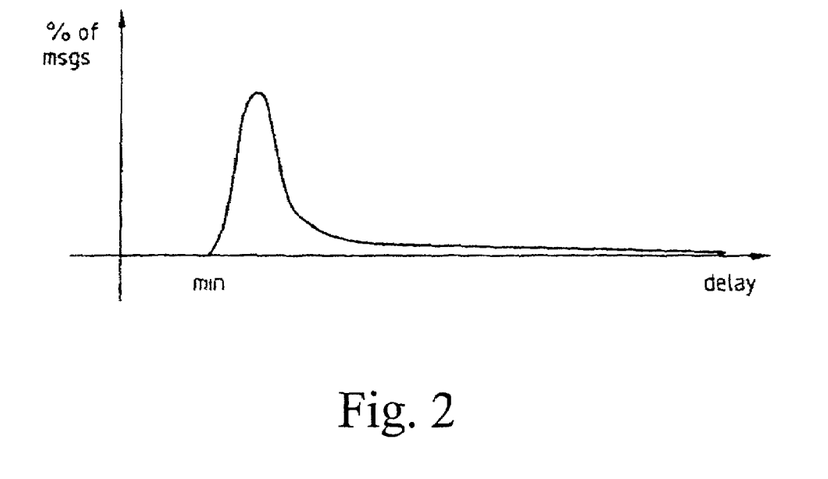
FIG. 2 is a distribution of roundtrip delays.

In distributed systems the task of synchronizing clocks is made difficult, among other reasons, because of the existence of hardly predictable communication delays. There is an arbitrary, random time delay between a time when a message is sent from one computer to a time when the message is received by another computer. At a minimum this is the propagation delay, or the time it takes physically from sending to arriving in the absence of transmission errors and other system delays. An upper bound for this delay can not be given in general. It can depend on the amount of communication and computing going on in parallel in the system, on the possibility of transmission errors (re-transmittance of the message in TCP/IP), and other random events, for example, page faults, process switches, and establishment of new communication routes). As shown in FIG. 2, the distribution has a maximum density at a point between the minimum and the median delay, with a long thin tail to the right. In this example, 5000 roundtrip delays between two light MVS processes, running on two IBM 4381 processors connected via a channel to channel LAN, were measured (Dong, Private Communications June 1988). The minimal roundtrip delay measured was min=4.22 ms, and the maximal round trip delay was max=93.17 ms. 95% of all roundtrip delays measured, were smaller than 5.2 ms and therefore a median of 4.48 ms and an average roundtrip delay of 4.91 ms result.

The delay has been found to be environmentally dependent. The delay can, under some circumstances, be approximated by a truncated normal distribution. Three main types of distributions were observed by Elteto and Molnar, related to rare, medium and busy traffic (see FIGS. 3, 4 and 5).

Figure 3:
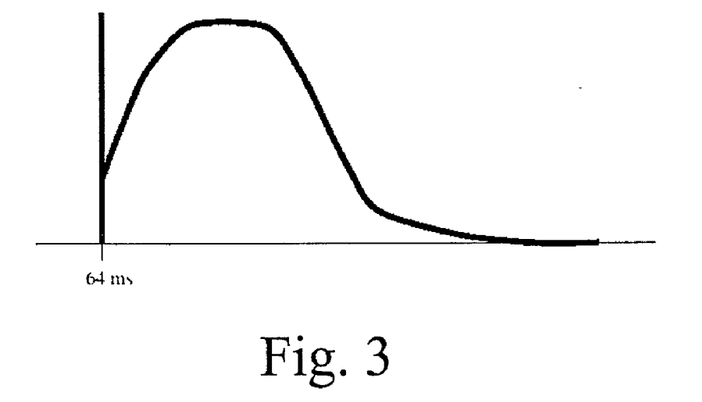
FIG. 3 is a roughly outlined histogram of the medium period.
Figure 4:
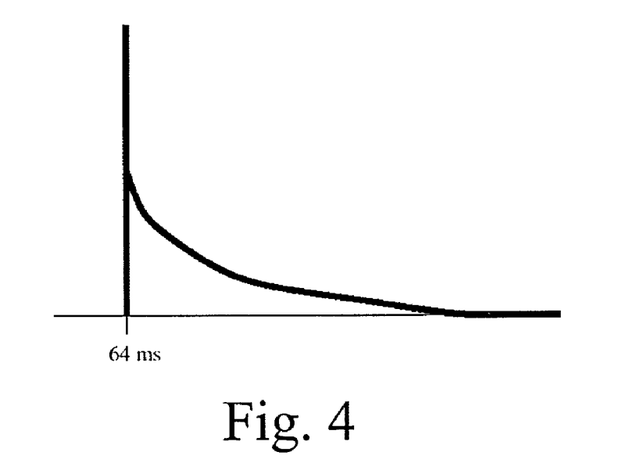
FIG. 4 is a roughly outlined histogram of the rare period.
Figure 5:
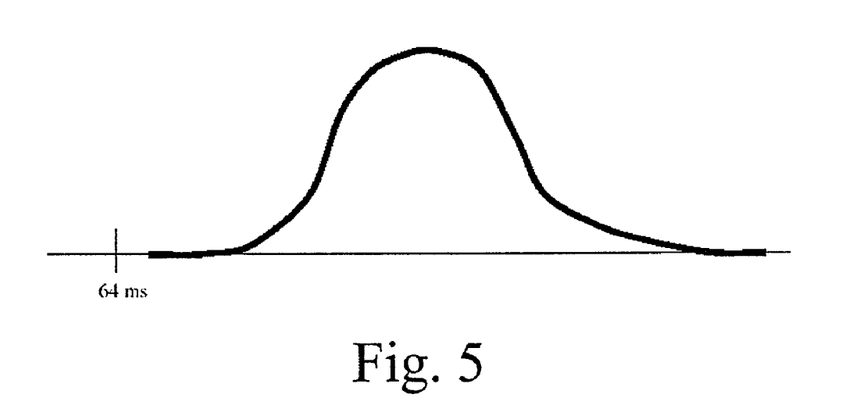
FIG. 5 is a roughly outlined histogram of the busy period.

Here again, the minimum roundtrip delay is determinated by propagation delay, which is in this case 64 ms. The main difference between the distributions given in FIGS. 3, 4 and 5 is the number and location of local maxima. The busy case can be approximated by a truncated normal distribution, if roundtrip delays beyond 600 ms are ignored. Therefore only a small number of "bad" values had to be deleted in this measurement (4 out of 543). Though this fact does not prove clearly that the originating distribution is a normal one, it is implied. This implication can be used to estimate the roundtrip delay, but as the TCP traffic differs from those traffic types, e.g. road traffic, arrivals at a telephone exchange, and customer demands, it needs to be inferred, that the currently governing distribution changes suddenly, because of the properties of the TCP connection.

Figure 6:
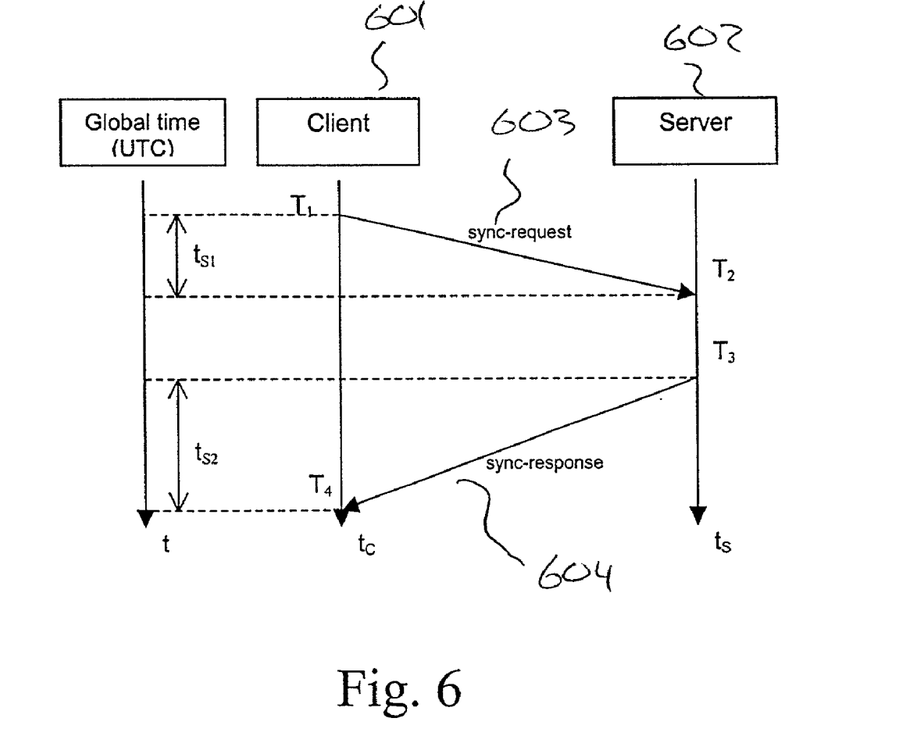
FIG. 6 shows messages for synchronization over TCP/IP, according to an embodiment of the present invention.

Referring to FIG. 6, according to an embodiment of the present invention at least two messages are needed to synchronize two computers, 601 and 602, connected to each other via a TCP/IP socket connection. The client 601 stores at point $T_1$ its current local time. The client 601 sends the message "sync-request" 603, containing the time $T_1$, to the server 602. As it takes the message an unknown amount of time $t_{S1}$ (=transfer time) to be transmitted from the client 601 to the server 602, it arrives at time $T_2$ at the server 602. $T_2$ is the local time of the server and therefore independent from the local clock of the client 601. On arrival of the "sync-request" 603 at the server 602, the server 602 stores the time $T_2$. The server 602 sends a "sync-response" message 604 back to the client 601, which includes the times $T_1$, $T_2$, and $T_3$, which is the time the server 602 retrieved from his local clock before sending the "sync-response" message 604 to the client 601. The transmission time of this message from the server 602 to the client 601 in this case then is $t_{S2}$.

Because $t_{S2}$ depends on how it is routed, this time need not be the same as $t_{S1}$. Upon arrival of the message at the client, the client stores the local time in the variable $T_4$.

An offset can be estimated as follows:
$\Theta_0$: comparative real offset of two machines
$\Theta_e$: estimated offset
$\delta$: calculated roundtrip-delay
where:

$$T_2 = T_1 + \Theta_0 + t_{S1} \quad \text{Equation 3}$$

$$T_3 = T_4 + \Theta_0 - t_{S2} \quad \text{Equation 4}$$

$$a = T_2 - T_1 \quad \text{Equation 5}$$

$$b = T_3 - T_4 \quad \text{Equation 6}$$

$$\delta = a - b = (T_2 - T_1) - (T_3 - T_4) = t_{S1} + t_{S2} \quad \text{Equation 7}$$

$$\Theta_e = \frac{a+b}{2} = \frac{2\Theta_0 + (t_{S1} - t_{S2})}{2} \approx \Theta_0 \quad \text{Equation 8}$$

only if $\delta$ is near the minimum roundtrip delay (=propagation delay), otherwise, no estimation is possible, and therefore no synchronization is possible.

As only two equations, Equation 3 and Equation 4, result from the above measurements (see FIG. 6), and these equations contain three unknown variables, $\Theta_0$, $t_{S1}$, and $t_{S2}$, it may not be possible to calculate the value for $\Theta_0$ exactly. Therefore, the value for $\Theta_0$ can be estimated and is stored in the value $\Theta_e$ (see Equation 8). Let $t_{S1} = m\_d + \alpha$; ($\alpha > 0$) and $t_{S2} = m\_d + \beta$; ($\beta > 0$) be the real time delays, whereas m_d is only the propagation delay, the maximum error of estimating $\Theta_0$ results in:

$$\text{maximum error: } e = \max\left(\frac{1}{2}\beta, \frac{1}{2}\alpha\right) \quad \text{Equation 9}$$

From Equation 9, it can be infered that, as the round trip delay decreases the client's error in reading the server's clock also decreases. Thus, if an error smaller than $\epsilon$ shall be achieved, every attempt measuring a roundtrip delay larger than 2u needs to be discarded, where:

$$u = (\epsilon + m\_d) = (2e + m\_d) \quad \text{Equation 10}$$

The closer u is to m_d, the better is the client's reading precesion.

Let p be the probability that the client observes a roundtrip delay greater than 2u. Therefore, the probality that the synchronization attempt fails is p. Thus, there exists a trade off between the achievable precision, and the probabilty (1-p) of success. The better the desired precision, the smaller is the probabilty of success.

This probability can be improved by allowing several successive synchronization attempts. To achieve a certain degree of independence between two consecutive reading attemps, they can be seperated by w units of time (2 seconds up to 5 seconds is a common value). The probability for a successful synchronization attempt is:

$$P_{success} = 1 - p^k; \quad \text{Equation 1}$$

where: k is the maximum number of successive reading attempts allowed. For large values of k and a choice of w so that the different reading attempts can be assumed to be independent from each other, Bernoulli's law states, that the average number $\bar{n}$ of reading attempts, necessary for a successful synchronization is $$\bar{n} = \frac{1}{1-p} \quad \text{Equation 12}$$

It can be said that there exist two major strategies to synchronize clocks of distributed computers. The first one could be called the "Aggressive Strategy" characterized by a roundtrip delay threshold u close to the minimum round trip delay. It may need several reading attempts for a successful synchronization, but it achieves a high precesion. In this case the high risk of not being able to synchronize the clocks to each other must not be forgotten. The second one, characterized by a roundtrip delay threshold u close to the maximum roundtrip delay, needs much less messages for synchronization. Therefore, it bears a much lower risk of not being able to synchronize, but may achieve only poor precision.

Most of the published clock synchronization algorithms until 1989 assumed the existence of an upper limit max for the roundtrip delays. However, this assumption is not true. If the roundtrip delay is smaller than the upper bound max, Lundulius and Lynch showed 1984, that these methods cannot synchronize better than $$(max - min) * \left(1 - \frac{1}{n}\right) \quad \text{Equation 13}$$

where: n is the number of clients which have to be synchronized.

Considering two quartzes, oscillating with the frequencies $f_1$ and $f_2$, both not equal to the desired frequency $f_0$. Assuming the temperature to be roughly constant but not necessarily the same for the two quartzes, the difference in frequency between the two will be constant.

If the relative inaccuracies $$\frac{f_q - f_0}{f0}$$

are $\Delta_1$ and $\Delta_2$, the resulting offset after a measurement time t will be:

$$\text{offset} = t \cdot (\Delta_1 - \Delta_2) \quad \text{Equation 14}$$

where $\Delta_1$ represents the inaccuracy of the server. This clearly represents the equation of a straight line.

Figure 7:
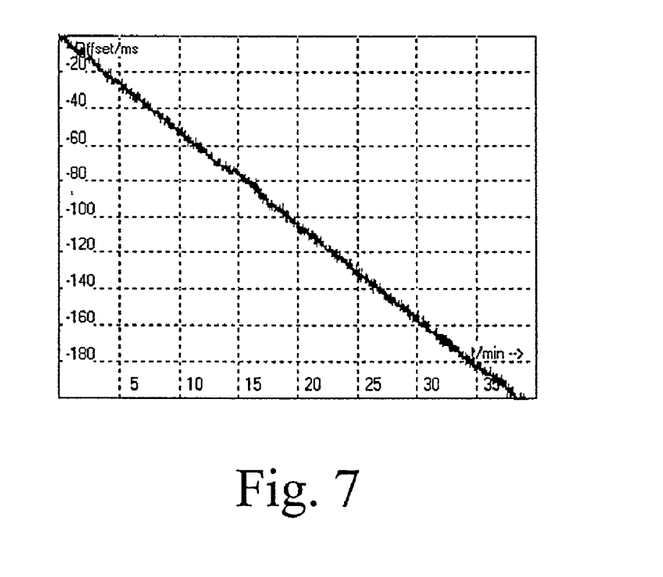
FIG. 7 shows the total offset between two unsynchronized computers, according to an embodiment of the present invention.

The offset between to PCs with independent clocks increases almost linearly as can be seen from FIG. 7. The reason for this behavior can be found in the physical properties of quartz crystals. The frequency of each quartz depends heavily on the angle of the AT cut, the height of the cut and its current temperature. Because of technical and physical reasons, the manufacturing of quartzes with exactly the same frequency is impossible.

To compute the parameters for a line, for example, as shown in FIG. 7, a linear regression can be used, which fits a straight line:

$$y = a + b \cdot x \qquad \text{Equation 15}$$

to a given collection of N measurement pairs $(y_i; x_i)$ with minimum mean square error. Thus, the values to be determined are a and b. The parameters a and b can be chosen so that the sum of the squares of the deviation from the straight line is minimized:

$$LQS = \sum_{i=1}^{N} [y_i(mess) - y_i(comp)]^2 \qquad \text{Equation 16}$$

With Equation 15 it can be concluded:

$$LQS = \sum_{i=1}^{N} [y_i(mess) - (a + b \cdot x_i)]^2 \qquad \text{Equation 17}$$

This sum can be minimized, for example:

$$\frac{\partial LQS}{\partial a} = \frac{\partial LQS}{\partial b} = 0 \qquad \text{Equation 18}$$

Given Equation 17 and Equation 18, the values of a and b can be determined to be:

$$b = \frac{N \cdot S_{xy} - S_y \cdot S_x}{N \cdot S_{xx} - (S_x)^2} \qquad \text{Equation 19}$$

$$a = \frac{S_y - b \cdot S_x}{N} = \frac{S_{xx} \cdot S_y - S_x \cdot S_{xy}}{N \cdot S_{xx} - (S_x)^2} \qquad \text{Equation 20}$$

$$\text{with } S_x = \sum_{i=1}^{N} x_i \qquad \text{Equation 21}$$

$$S_y = \sum_{i=1}^{N} y_i \qquad \text{Equation 22}$$

$$S_{xx} = \sum_{i=1}^{N} (x_i)^2 \qquad \text{Equation 23}$$

$$\text{and } S_{xy} = \sum_{i=1}^{N} x_i \cdot y_i \qquad \text{Equation 24}$$

Figure 8:
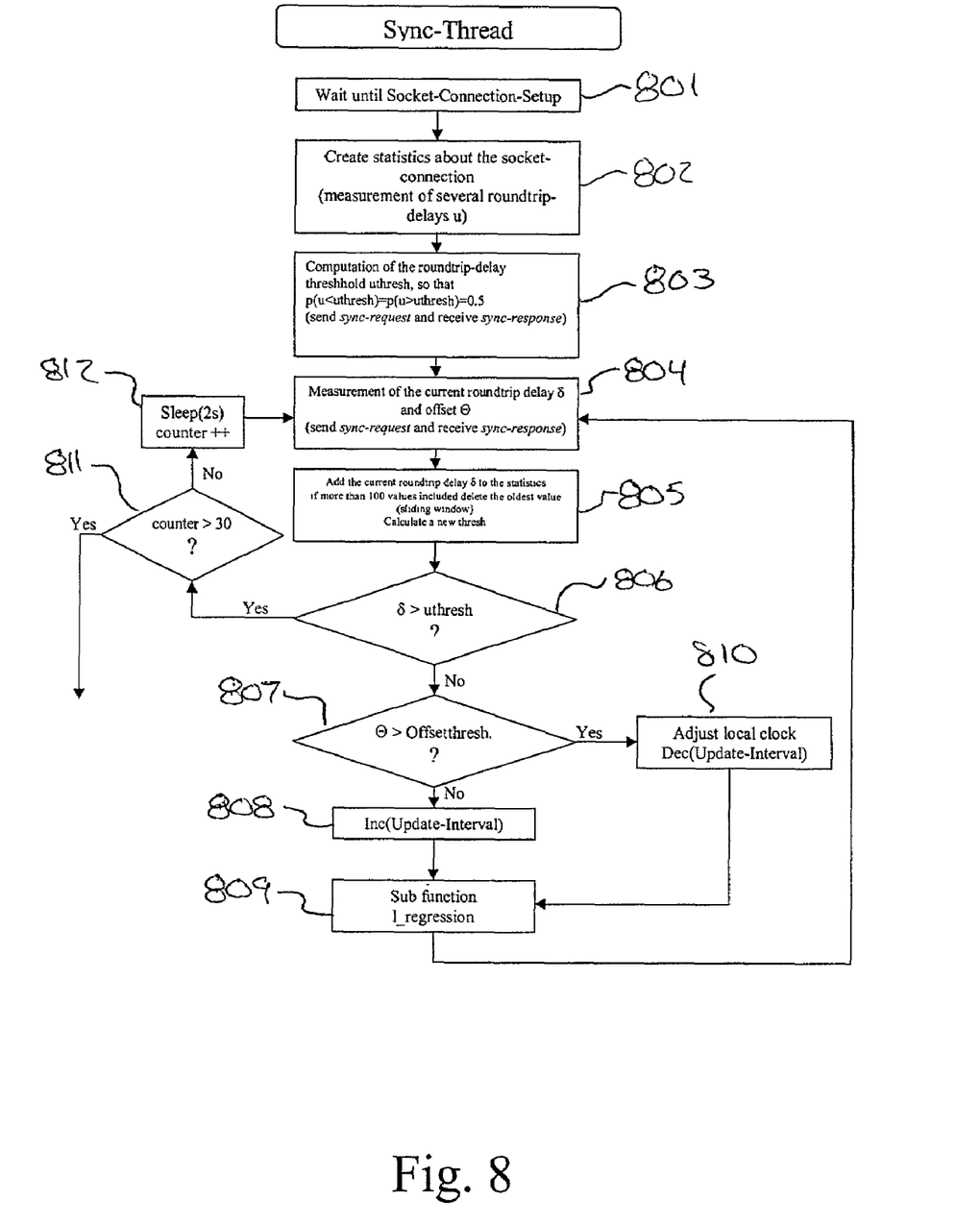
FIG. 8 illustrates an algorithm with linear regression, client side, according to an embodiment of the present invention.
Figure 9:
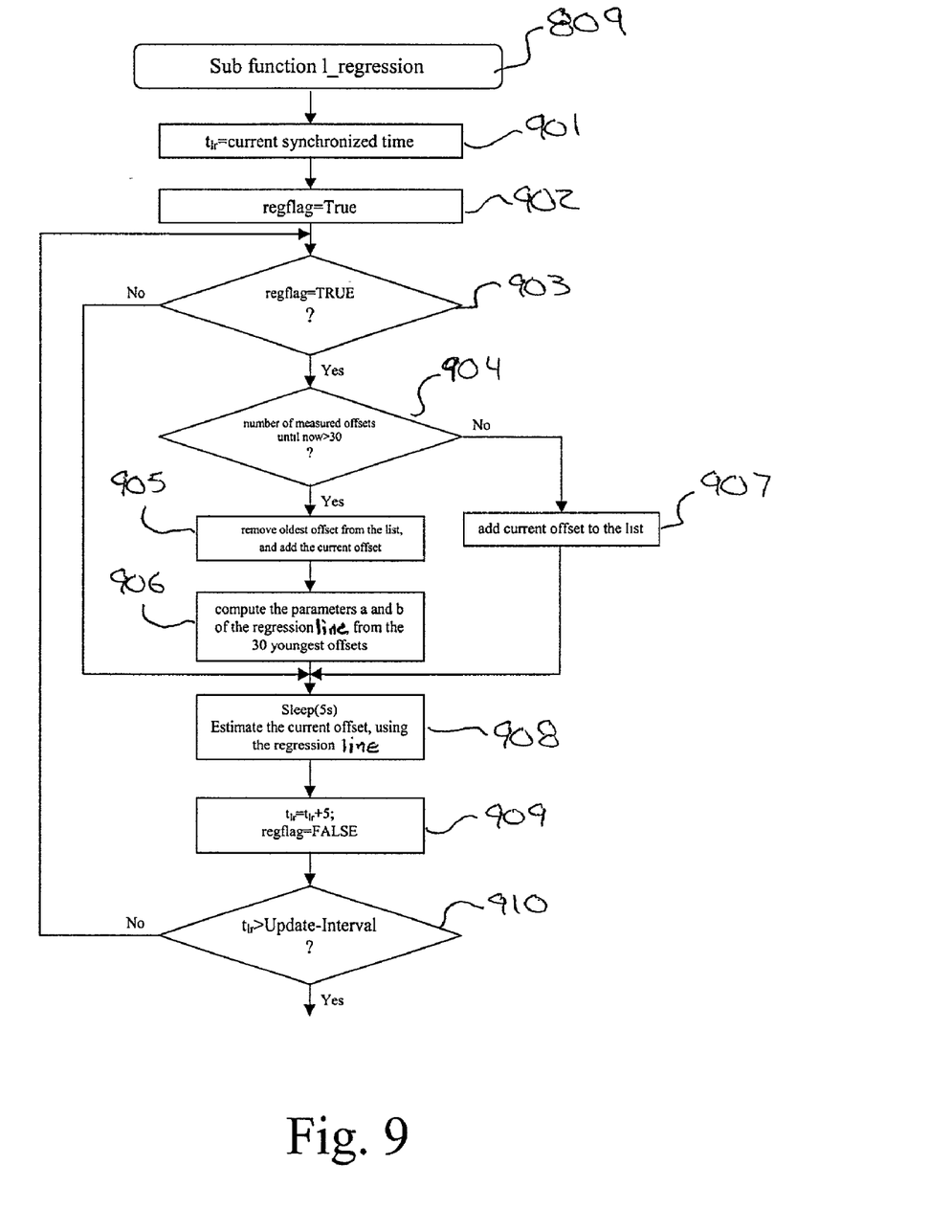
FIG. 9 is an algorithm of the sub function l_regression, according to an embodiment of the present invention.

According to an embodiment of the present invention, a method for estimating an offset by using linear regression is shown in FIGS. 8 and 9.

For the first thirty values, a conventional synchronization method, for example, one based on Flaviu's method, can be used, because about thirty values are at least needed to make reasonably precise predictions of future offsets with linear regression. To synchronize as soon as possible in order to start the collaborative video discussion, the method does not initially collect the thirty values. The initial collection of the values takes about 20 minutes. In this time the method can achieve a precision of at least 20 ms. As soon as thirty offset values are measured, the parameters a and b of the regression line are computed. From that time on every 5 seconds a new estimate of the current offset is computed, by using the line, whose parameters a and b were computed before. If the value of the current offset is smaller than 10 ms, the synchronization interval is increased by 5 seconds, and no further action is taken. Only if the current offset is bigger than 10 ms, the synchronization interval is decreased by 5 seconds, and the estimated offset is replaced by the current offset.

Figure 10:
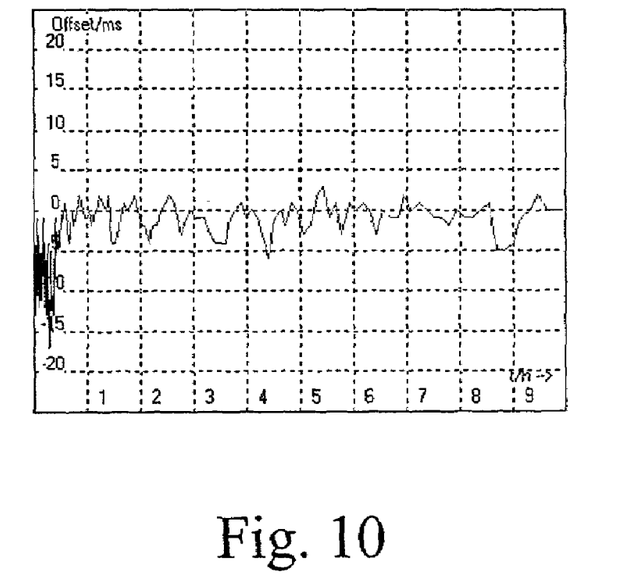
FIG. 10 is a transient response of the interval between two synchronization attempts using linear regression, 19.6 kbps connection, according to an embodiment of the present invention.
Figure 11:
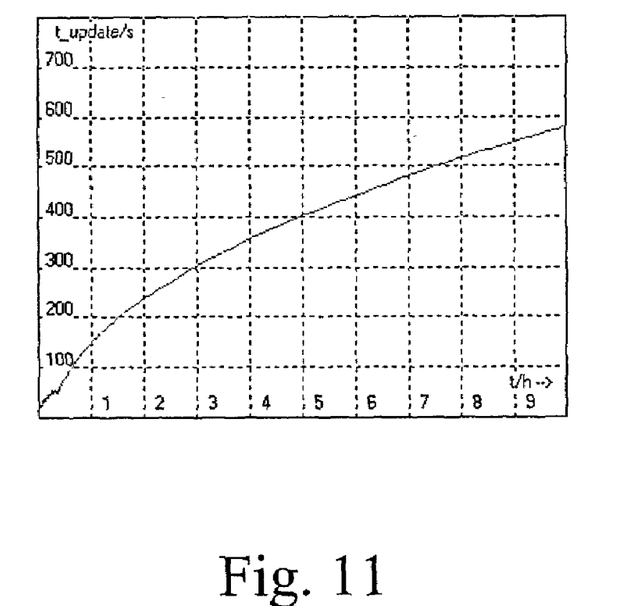
FIG. 11 shows a measured offset between two synchronized computers (using linear regression), connected via a 19.6 kbps modem, according to an embodiment of the present invention.

The parameters a and b of the regression line are always computed from the 30 most recent values of the measured offset. Thus, again a sliding window is implemented, so that changes in the drift rates (because of possible temperature changes) of the two quartzes are taken into account. Thus, a method according to an embodiment of the present invention can achieve remarkable improvements in the precision, as well as in the number of messages exchanged between the time server and the time client. As shown in FIGS. 10 and FIG. 11, one computer, the time server, was connected directly to the 100 Mbps LAN, and the time client was connected to the 100 Mbps LAN via a 19.6 kbps dial in connection. In the first 20 minutes, the first synchronization approach is used, so that the client can immediately synchronize to the server with a precision of at least 20 ms after the connection is set up. When the first 30 offset value have been measured, the linear regression approach takes over. Now the maximum offset decreases to 5 ms. As can be seen in FIG. 10, the synchronization interval also starts to increase continuously, even beyond the 10 h run time. The synchronization interval has now reached a value of nearly 10 minutes, but the precision is still better than 5 ms. In the first approach, the precision is about 10 ms, and the synchronization interval did not reach values longer than about one minute.

Referring to FIG. 8, a method for clock synchronization across a network includes waiting for a socket-connection between at least two processors across the network 801. Upon creation of the socket-connection the method collects statistics about the connection, including a measurement of roundtrip delay 802. The method determines a roundtrip-delay threshold 803, where the probability of the round-trip delay being greater than the threshold is about 0.5 and the probability of the round-trip delay being less than the threshold is about 0.5. The method determines a current round-trip delay and an offset 804. The current round-trip delay is added to the statistics, and a new threshold is determined 805. The method determines whether the current roundtrip delay is greater than the new threshold 806. If so, the method determines whether thirty round-trip delays have been determined 811. Upon determining thirty round-trip delays the method enters a synchronization routine. The method may take over from another routine. If thirty delays have not been determined the method determines a current round-trip delay and an offset 804. Upon determining that the current roundtrip delay is not greater than the new threshold 806, the method determines whether the offset is greater than an offset threshold 807. If the offset is greater than the offset threshold the method adjusts a local clock 810, decrementing by an update-interval. If the offset is less than the offset threshold, the method adjust the local clock 808, incrementing by the update-interval. After adjusting the clock, 810 or 808, the method determines a linear regression 809, and continues to determine a current round-trip delay and an offset 804.

Referring to FIG. 9, a method according to an embodiment of the present invention is shown for the linear regression, 809 FIG. 8. A current synchronization time is set 901. A flag is set to TRUE 902 as a control mechanism. Upon determining that the flag is TRUE 903, the method determines whether the number of measured offsets is greater than thirty 904. Upon determining that the number of offsets is greater than thirty, the method removes an oldest offset from a list of offsets and adds a current offset to the list 905. The method determines parameters a and b of a regression line from the list of offsets 906, for example the thirty youngest offsets. Upon determining that the number of measured offsets is not greater than thirty, the method adds the current offset to the list 907. The method estimates the current offset using the regression line 908. The current synchronization time is incremented and the flag is set to FALSE 909. The method determines whether the current synchronization time is greater than an update-interval 910, and if not, inspects the flag 903, and upon determining the flag to be FALSE, estimates the current offset using the regression line 908. Upon determining the current synchronization time to be greater than the update-interval 910, the method measures a current roundtrip delay and offset, 804, FIG. 8.

According to an embodiment of the present invention, a method can be used for conferencing over TCP/IP networks, and especially for collaborative discussion of video content. The method takes into account that mobile clients join a video discussion conference, so that the bandwidth necessary for clock synchronization is reduced as far as possible.

One of the main advantages of the present invention is that the needed bandwidth for synchronization can be reduced, because the period between two synchronization attempts is more than 10 times longer than in, for example, Flaviu's approach. Only every ten minutes 32 bytes are sent in each direction. In Flaviu's approach, about every minute this synchronization message is exchanged. If the synchronization interval can be increased, the processing load on the time server can be reduced.

According to an embodiment of the present invention, a more precise synchronization can be achieved as compared to the prior art. A method according to an embodiment of the present invention takes into account the properties of quartz oscillators.

Thus, a method can deal with a frequency deviation of up to about $+/-2\cdot10^{-4}$, plus some margin for thermal effects, because the "master" may also have an inaccuracy of $+/-10^{-4}$. In summary, the algorithm using linear regression to estimate the offset, gives a more persuasive impression.

Having described embodiments for a method for clock-synchronization in distributed systems, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for synchronizing distributed processors comprising the steps of:
   establishing a socket-connection between at least two processors;
   determining a roundtrip delay;
   determining a roundtrip-delay threshold;
   determining a current round-trip delay and an offset;
   adding the current round-trip delay to a list of roundtrip delays;
   determining a new roundtrip-delay threshold;
   determining whether the current roundtrip delay is greater than the new roundtrip-delay threshold;
   determining whether a desired number of round-trip delays have been determined upon determining the current roundtrip delay to be greater than the new roundtrip-delay threshold; and
   determining whether the offset is greater than an offset threshold, adjusting a clock according to whether the offset is greater than the offset threshold and determining a linear regression upon determining that the current roundtrip delay is not greater than the new roundtrip-delay threshold.

2. The method of claim 1, wherein a probability of the round-trip delay being greater than the roundtrip-delay threshold is about 0.5 and a probability of the round-trip delay being less than the roundtrip-delay threshold is about 0.5.

3. The method of claim 1, wherein the step of determining whether the desired number of round-trip delays have been determined further comprises the step of entering a synchronization method upon determining the desired number round-trip delays.

4. The method of claim 1, wherein the step of determining whether the desired number of round-trip delays have been determined further comprises recursively performing the step of determining the current round-trip delay and an offset upon determining less than the desired number delays.

5. The method of claim 1, wherein the step of adjusting the clock according to whether the offset is greater than the offset threshold further comprises the steps of:
   decrementing by an update-interval upon determining the offset to be greater than the offset threshold; and
   incrementing by the update-interval upon determining the offset to be less than the offset threshold.

6. The method of claim 1, further comprising recursively performing the step of determining the current round-trip delay and the offset.

7. The method of claim 1, wherein the step of determining the linear regression further comprises the steps of:
   setting a current synchronization time;
   determining whether a number of measured offsets is greater than a desired number:
      upon determining that the number of measured offsets is greater than the desired number, removing an oldest offset from a list of offsets and adding a current offset to the list of offsets and determining parameters of the linear regression from the list of offsets;
      upon determining that the number of measured offsets is not greater than the desired number, adding the current offset to the list of offsets;
   estimating the current offset using the linear regression;
   incrementing the current synchronization time; and
   determining whether the current synchronization time is greater than an update-interval:
      upon determining the current synchronization time to be less than the update-interval, re-estimating the current offset using the linear regression;
      upon determining the current synchronization time to be greater than the update-interval, re-determining the current roundtrip delay and the current offset.

8. The method of claim 1, wherein the desired number of roundtrip delays is thirty.

9. A program storage device readable by machine, tangibly embodying a program of instructions executable by the machine to perform method steps for synchronizing distributed processors, the method steps comprising:
   establishing a socket-connection between at least two processors;
   determining a roundtrip delay;
   determining a roundtrip-delay threshold;
   determining a current round-trip delay and an offset;
   adding the current round-trip delay to a list of roundtrip delays;
   determining a new roundtrip-delay threshold;
   determining whether the current roundtrip delay is greater than the new roundtrip-delay threshold;
   determining whether a desired number of round-trip delays have been determined upon determining the current roundtrip delay to be greater than the new roundtrip-delay threshold; and
   determining whether the offset is greater than an offset threshold, adjusting a clock according to whether the offset is greater than the offset threshold and determining a linear regression upon determining that the current roundtrip delay is not greater than the new roundtrip-delay threshold.

10. The method of claim 9, wherein a probability of the round-trip delay being greater than the roundtrip-delay threshold is about 0.5 and a probability of the round-trip delay being less than the roundtrip-delay threshold is about 0.5.

11. The method of claim 9, wherein the step of determining whether the desired number of round-trip delays have been determined further comprises the step of entering a synchronization method upon determining the desired number round-trip delays.

12. The method of claim 9, wherein the step of determining whether the desired number of round-trip delays have been determined further comprises recursively performing the step of determining the current round-trip delay and an offset upon determining less than the desired number delays.

13. The method of claim 9, wherein the step of adjusting the clock according to whether the offset is greater than the offset threshold further comprises the steps of:
   decrementing by an update-interval upon determining the offset to be greater than the offset threshold; and
   incrementing by the update-interval upon determining the offset to be less than the offset threshold.

14. The method of claim 9, further comprising recursively performing the step of determining the current round-trip delay and the offset.

15. The method of claim 9, wherein the step of determining the linear regression further comprises the steps of:
   setting a current synchronization time;
   determining whether a number of measured offsets is greater than a desired number:
      upon determining that the number of measured offsets is greater than the desired number, removing an oldest offset from a list of offsets and adding a current offset to the list of offsets and determining parameters of the linear regression from the list of offsets;
      upon determining that the number of measured offsets is not greater than the desired number, adding the current offset to the list of offsets;
   estimating the current offset using the linear regression;
   incrementing the current synchronization time; and
   determining whether the current synchronization time is greater than an update-interval:
      upon determining the current synchronization time to be less than the update-interval, re-estimating the current offset using the linear regression;
      upon determining the current synchronization time to be greater than the update-interval, re-determining the current roundtrip delay and the current offset.

* * * * *